United States Patent [19]

Portnoy et al.

[11] Patent Number: 4,716,186

[45] Date of Patent: Dec. 29, 1987

[54] STARCH DERIVATIVES AND METHODS OF MAKING USING SAME

[75] Inventors: Norman A. Portnoy, Decatur; Larry P. Avery, Oreana, both of Ill.

[73] Assignee: A. E. Staley Manufacturing Company, Decatur, Ill.

[21] Appl. No.: 849,930

[22] Filed: Apr. 9, 1986

[51] Int. Cl.$^4$ ............... C08B 31/08; C08B 33/04; C08B 35/04

[52] U.S. Cl. .................. 524/50; 524/52; 536/111

[58] Field of Search ............ 536/102, 111; 524/47, 524/50, 52

[56] References Cited

U.S. PATENT DOCUMENTS 2,773,057  12/1956  Hjermstad et al. ............... 536/111
2,802,000  8/1957   Caldwell et al. ................ 536/111

FOREIGN PATENT DOCUMENTS 520866  1/1956  Canada ............... 536/111

*Primary Examiner*—Delbert R. Phillips
*Assistant Examiner*—Nathan M. Nutter
*Attorney, Agent, or Firm*—Michael F. Campbell; James B. Guffey; J. Daniel Wood

[57] ABSTRACT

Cold water soluble methylated, ethylated or carboxymethylated non-gelatinized granular starch materials are provided which are particularly well suited for use as thickeners and/or rheology modifiers in latex paint compositions. Such starch materials have a methyl, ethyl or carboxymethyl degree of substitution (D.S.) of from about 0.15 to about 1 and have a ratio of total inorganic anion content (in weight percent on a starch material dry solids weight basis) to methyl, ethyl or carboxymethyl D.S. of about 14 or less.

13 Claims, No Drawings

STARCH DERIVATIVES AND METHODS OF MAKING USING SAME

BACKGROUND OF THE INVENTION

The present invention pertains to certain cold water soluble methylated, ethylated or carboxymethylated non-gelatinized granular starch derivatives; to processes for the preparation of such starch derivatives and to the use thereof in thickening latex paint compositions.

Methylated, ethylated and carboxymethylated starches are generally known materials which can be prepared by reacting a starch starting material with, respectively, a methylating agent such as dimethyl sulfate or a methyl halide, an ethylating agent such as diethyl sulfate or an ethyl halide or a carboxymethylating agent such as a haloacetic acid or a salt thereof under aqueous alkaline reaction conditions.

U.S. Pat. No. 1,444,257 to Lillenfeld (issued Feb. 6, 1923) discusses the usefulness of ethylated starch and methylated starch as protective colloids and, according to the book entitled "Starch: Chemistry and Technology, Volume 11, Industrial Aspects" by Whistler and Paschall (1967) at page 314, such starch derivatives have also been suggested as being useful as soil suspending agents in detergents, as flocculants for pigments, thickeners in paper screening and as a component of photographic transfer layers.

A book entitled Starch Production Technology by J. A. Radley, Applied Science Publishers, Ltd. (1976) indicates, at page 506, that carboxymethyl starch derivatives are much used in the textile industry. Such book also reports that conducting the reaction to prepare such derivatives in a water-miscible solvent (preferably isopropanol) containing minor amounts of water improves the reaction efficiency.

U.S. Pat. No. 3,769,248 to Kovats (issued Oct. 30, 1973) mentions carboxymethyl starch as being suitable for use as a protective colloid in vinyl acetate emulsion polymerization and copolymerization processes.

At page 319 of the aforementioned book by Whistler and Paschall, it is noted that miscellaneous uses of carboxymethyl starch include use as an indicator in iodometric titrations, use as a soil conditioner, use as a component in latex paint, use as a paint remover component, use as a binder for kaolin castings as well as usage in lithography applications, photographic film emulsions and granular explosive compositions.

In the manufacture of methylated, ethylated and carboxymethylated starch derivatives via the reaction, respectively, of starch with methyl halides, dimethyl sulfate, diethyl sulfate, ethyl halides, haloacetic acids (or salts thereof), etc. under aqueous alkaline conditions, inorganic salts such as alkali metal (e.g., sodium or potassium) halides or sulfates are generated as reaction byproducts. On page 507 of the aforementioned book by J. A. Radley, it is stated that attempts to remove such inorganic salts from carboxymethyl starch products have included (a) precipitation and washing with alcohol; (b) salting out with sodium sulfate and screening off the salts after grinding; and (c) precipitation with alum and resolubilizing with alkali. This reference goes on to note, however, that for the majority of commercial applications, the salts are left in since their technical effect is one of dilution only.

SUMMARY OF THE INVENTION

In accordance with the present invention, there are provided cold water (e.g., 25° C.) soluble methylated, ethylated and carboxymethylated granular starch derivatives having reduced levels of inorganic anions contained therein. More specifically, such materials are provided having an average degree of methyl, ethyl or carboxymethyl substitution of from about 0.15 to about 1.0 of such substituents per anhydroglucose unit in the starch molecule and having a ratio of inorganic anion content (in weight percent on a starch derivative dry solids weight basis) to methyl, ethyl or carboxymethyl degree of substitution (D.S.) of about 14 or less.

The indicated starch derivatives have been found to be particularly suitable for use as latex paint thickener ingredients. For example, it has been observed that such derivatives provide significant thickening in aqueous solutions at 2 and 3 weight percent solids levels whereas comparable starch derivatives having inorganic anion content to D.S. ratios of greater than 14 provide little or no thickening action at such solids levels in aqueous solution. Additionally, while the latter materials have been found to provide thickening action commencing at or about 4% addition levels in aqueous solution, the former materials impart substantially higher viscosities to aqueous solutions when used at such level of addition.

In accordance with the foregoing, the present invention, in one of its aspects, is a latex paint composition comprising, on a paint composition total weight basis:

(a) from about 10 to about 35 weight percent of dispersed colloidal particles of a natural or synthetic polymer material;

(b) from about 20 to about 60 weight percent of dispersed pigment particles;

(c) from about 35 to about 55 weight percent of water; and (d) from about 0.1 to about 1 weight percent of thickener ingredient selected from the group consisting of granular methylated, ethylated or carboxymethylated starch materials, said thickener ingredient (1) being at least about 90% soluble in 25° C. water, (2) having an average degree of methyl, ethyl or carboxymethyl substitution in the range of from about 0.15 to about 1.0 of such substituents per anhydroglucose units in the starch molecule and (3) having a ratio of inorganic anion content (in weight percent on a starch derivative dry solids weight basis) to methyl, ethyl or carboxyl degree of substitution (D.S.) of about 14 or less.

A particularly noteworthy feature or benefit associated with the use of the indicated starch derivatives as latex paint thickeners herein resides in the fact that the resulting paint compositions have notably improved flow/leveling characteristics and spatter resistance relative to that exhibited by comparable paint compositions in which hydroxyethyl cellulose (HEC) is employed as the paint thickener ingredient.

In another of its embodiments, the present invention pertains to a method for preparing the aforementioned granular starch derivatives having lower than usual levels of monovalent and/or polyvalent inorganic anions contained therein. More particularly, such embodiment is a method for preparing a methylated, ethylated, or carboxymethylated starch material having an average degree of methyl, ethyl or carboxymethyl substitution in the range of from about 0.15 to about 1.0 of such substituents per anhydroglucose unit in the starch molecule and having an inorganic anion content (in weight percent on a starch material dry solids weight basis) to methyl, ethyl or carboxymethyl D.S. ratio of about 14 or less; said method comprising:

a. reacting a granular starch starting material with from about 0.15 to about 1.2 moles, per equivalent of anhydroglucose unit within said starch starting material, of a methylating, ethylating or carboxymethylating agent in the presence of an alkali metal oxide or hydroxide catalyst;

b. neutralizing residual alkali metal oxide or hydroxide catalyst with an organic carboxylic acid material;

c. washing the resulting methylated, ethylated or carboxymethylated starch product to reduce the inorganic anion content thereof to a level corresponding to an inorganic anion content to methyl, ethyl or carboxymethyl D.S. ratio of about 14 or less.

As used herein, the term "inorganic" onion is not intended to encompass or include hydroxyl anions (i.e., $OH^-$).

DETAILED DESCRIPTION OF THE INVENTION

The cold water soluble methylated, ethylated or carboxymethylated granular starch derivatives of the present invention can be suitably derived from starch starting materials obtained from a wide variety of plant sources such as, for example, corn, potato, wheat, rice, waxy maize, tapioca, etc. Such starch starting materials can be unmodified or can be chemically modified such as, for example, by known multifuctional starch crosslinking agents.

Preferred starch starting materials for use herein include unmodified, ungelatinized granular starches obtained from corn, waxy maize, potato or tapioca.

The term "ungelatinized" as used herein connotes starch which has not been subjected to granule fragmenting process conditions and which therefore consists essentially of whole unfragmented granules.

The term "cold water soluble" as used herein connotes starch materials which are at least about 90% soluble in 25° C. water.

For the purposes of the present invention, the method chosen for initially preparing the methylated, ethylated or carboxymethylated starch material of interest via the reaction, respectively, of a starch starting material with a methylating, ethylating or carboxymethylating agent is not particularly critical so long as the resulting starch derivative is cold water soluble; is in non-gelatinized, granular form; has a methyl, ethyl or carboxymethyl D.S. of from about 0.15 to about 1; and an inorganic anion content to D.S. ratio of about 14 or less. Thus, said methylated, ethylated or carboxymethylated starch derivative can suitably be prepared by conducting the derivatization reaction in an aqueous alkaline reaction medium containing sufficiently high levels of inorganic salts to effectively prevent gelatization of the starch material during the reaction process and can subsequently be washed (e.g., with an aqueous lower alcohol solution) to reduce the inorganic anion content to satisfy the indicated inorganic anion content to D.S. ratio.

Preferably, however, said derivatization reaction is conducted in a water miscible organic solvent (preferably a lower, e.g., $C_1$-$C_4$, alkanol such as methanol, ethanol or isopropanol) containing a relatively small amount of water (e.g., from about 1 to about 20 weight percent water on a solvent plus water weight basis) and the resulting methylated, ethylated, or carboxymethylated starch product (which remains in substantially non-gelatinized granular form) is separated from the liquid reaction medium by a suitably convenient means such as by centrifugation, filtration, etc.

The reaction between the methylating, ethylating or carboxymethylating agent and the starch starting material is typically conducted at a dry starch solids content within the reaction mixture of from about 8 to about 25 (preferably from about 10 to 18) weight percent (total weight basis); at a temperature of from about 60° to about 130° C. (preferably from about 80° to about 110° C.); at an alkali metal oxide or hydroxide catalyst level of from about 0.2 to about 12 (preferably from about 0.5 to about 5) weight percent on a total reaction mixture weight basis; and for a reaction period of from about 0.4 to about 2½ hours (preferably from about ½ to about 1 hour). Typically, such reaction can be conveniently conducted in a glass (or glass-lined) vessel or, at higher temperatures, in a closed stainless steel reaction vessel capable of withstanding the pressure attendant to the reaction conditions.

The amount of methylating, ethylating or carboxymethylating agent (preferably methyl chloride, ethyl chloride or chloroacetic acid or a salt thereof) employed in the foregoing reaction will generally depend upon the degree of methyl, ethyl or carboxymethyl substitution desired within the final starch derivative. Since the average degree of substitution (D.S.) typically desired for products of interest herein is from about 0.15 to about 1.0 (preferably from about 0.15 to about 0.6) of the desired methyl, ethyl or carboxymethyl substituent per anhydroglucose unit within the starch molecule, the amount of methyl halide, ethyl halide or haloacetic acid (or salt) reactant employed will generally range from about 0.15 to about 1.2 (preferably from about 0.15 to about 0.9) moles of said reactant per equivalent weight of anhydroglucose units within the starch starting material.

Following the indicated derivatization reaction, residual alkali metal oxide or hydroxide catalyst is generally neutralized with an inorganic or organic acid material; the use of organic acids such as acetic, formic, oxalic or citric acid (most preferably acetic acid) being preferred in order to avoid the introduction of additional levels of inorganic anions. Thereafter, the neutralized, derivatized product is washed, preferably with an aqueous lower alcohol solution (typically containing from about 5 to about 30 weight percent of water), to reduce the inorganic anion content to the desired level.

Methylated, ethylated or carboxymethylated starch derivatives which are of particular interest relative to the present invention include those having an inorganic anion weight % :D.S. ratio of about 12 or less (preferably about 10 or less, more preferably less than about 5, and most preferably less than about 3). It is also preferred that the methylated, ethylated or carboxymethylated starch derivatives to be employed herein have a total ash content of less than 20 (more preferably less than 13) weight percent and a monovalent inorganic cation (e.g., sodium ion, potassium ion, etc.) content of about 7 weight percent or less (more preferably less than 5.5 weight percent).

It is also generally preferred that such starch derivatives have a monovalent inorganic anion (e.g., chloride ion, bromide ion, etc.) content of less than 5 (more preferably about 2 or less) weight percent and a polyvalent inorganic anion (e.g. sulfate ion, phosphate ion, etc.) content of less than 0.5 (more preferably less than about 0.25 and most preferably less than about 0.10 weight percent.

Additionally, it is also generally preferred that the present starch derivatives have a fat content of less than 0.25 (more preferably less than 0.15) weight percent.

In the event that the method chosen to initially prepare the methylated, ethylated or carboxymethylated starch derivatives do not provide ash, monovalent inorganic cation, mono and polyvalent anion, and fat contents and/or inorganic anion content to D.S. ratios within the aforementioned preferred ranges, such preferred values can generally be conveniently attained by further washings of said derivatives with an aqueous water-miscible solvent (preferably a lower alkanol such as methanol, ethanol or isopropanol) solution containing from about 5 to about 30 (preferably from about 10 to about 30) weight percent water.

As has been noted above, the indicated methylated, ethylated or carboxymethylated starch derivatives have been found to be particularly effective for use as thickener ingredients in latex paint compositions. In such usage, the resulting latex paint composition will generally comprise, on a total paint composition weight basis:

(a) from about 10 to about 35 (preferably from about 20 to about 35) weight percent of dispersed colloidal particles of a natural or synthetic polymer material;

(b) from about 20 to about 60 (preferably from about 40 to about 55) weight percent of dispersed pigment particles;

(c) from about 35 to about 55 (preferably from about 40 to about 50) weight percent water; and (d) from about 0.1 to about 1 (preferably from about 0.2 to about 0.7) weight percent of the aforementioned methylated, ethylated or carboxymethylated starch derivative as a thickener ingredient therein.

The aforementioned paint compositions may optionally (and typically will) also contain relatively small, but functionally effective, amounts of one or more of the conventionally employed latex paint adjunct ingredients such as, for example, surface active agents as dispersing aids, organic solvents such as ethylene glycol or propylene glycol as filming or coalescing aids, defoaming agents, wetting agents, preservatives, dyes and/or other coloring agents and the like.

Natural and synthetic polymer materials suitable for use herein in the form of stable colloidally dispersed aqueous emulsions or dispersions thereof include natural rubber latexes; emulsion polymerized, water insoluble film-forming homopolymers and/or copolymers of vinyl esters of lower carboxylic acids such as vinyl acetate, vinyl propionate, etc.: alkyl or hydroxyalkyl esters of ethylenically unsaturated carboxylic acids such as methyl methacrylate, ethyl acrylate, butyl acrylate, 2-hydroxyethyl acrylate, 2-ethylhexyl acrylate, etc: copolymers of monovinylidene aromatic monomers such as styrene, vinyl toluene, etc. with diolefin monomers such as 1,4-butadiene, etc.; homopolymers or copolymers of halide monomers such as vinyl chloride, vinylidene chloride etc. and the like.

Preferred polymer latexes for use herein include homopolymers and copolymers of vinyl acetate, butyl acrylate, styrene, butadiene, methyl methacrylate, ethyl acrylate, and the like with vinyl acetate homopolymer and copolymer materials and acrylic homopolymer and copolymer materials being particularly preferred.

As used herein with respect to the aforementioned latex polymer materials, the term "film-forming" connotes that, upon evaporation of the water from said latexes at normal room temperature (e.g., about 25° C.), the dispersed polymer particles coalesce together to form a continuous polymer film. Thus, when used in the indicated latex paint compositions (and air dried at ambient temperature following application as for example by brush or roller), the coalesced polymer particles serve as a binder to hold the pigmented coating together as a continuous protective and/or decorative layer and to effectively bind same to the painted substrate.

Pigment ingredients suitable for use in the subject latex paint compositions include any of those used conventionally in latex paint compositions such as, for example, titanium dioxide, talc, kaolin clay, calcium carbonate, etc.

Naturally, the subject latex paint compositions will typically also be formulated with conventional dyes or other colorants to impart the desired color thereto prior to use by the ultimate consumer.

The order of combining the aforementioned ingredients to form the subject latex paint compositions is not particularly critical and can be generally accomplished in any of several convenient, conventional fashions. However, it is generally preferred to first prepare an aqueous dispersion of the pigment material and to thereafter admix said pigment dispersion with the aqueous polymer latex to which has been previously incorporated any desired surfactants, filming aids, etc. as well as the selected methylated, ethylated or carboxymethylated starch thickener ingredient in an amount sufficient to impart the desired viscosity to the resulting latex paint compositions.

As has been alluded to earlier, latex paints are oftentimes initially prepared or formulated as a white pigmented composition and are subsequently admixed with the desired dyes or other colorant systems when purchased by the consumer at the actual retail outlet.

For the purposes of the present invention, the degree of methyl, ethyl or carboxymethyl substitution (D.S.) can be conveniently determined by either conventional wet chemical analytical techniques or by C-13 nuclear magnetic resonance (NMR) analysis; anion contents can be determined by conventional ion chromatography techniques; sodium (or other inorganic cation) contents can be determined by atomic absorption; and viscosities can be measured (and reported in centipoise, cps) using a Brookfield viscometer at 20 rpm in a pH 7.0 buffered aqueous solution.

The present invention is further understood and illustrated by reference to the following examples thereof in which all parts and percentages are on a weight basis, and all temperatures are in degrees Celcius, unless otherwise indicated.

EXAMPLES 1-8

In these examples, a series of cold water soluble carboxymethylated granular starches are prepared by slurrying 540 parts dry solids basis granular starch in an aqueous ethanol solution containing 3340 parts of ethanol and a total of 470 parts water; adding to said slurry 45-165 parts NaOH dissolved in 200 parts water; adding 53-195 parts chloroacetic acid dissolved in 400 parts ethanol and 50 parts water; and maintaining said reaction mixture in a closed stainless steel reaction vessel for a reaction period of 0.75 hours at 101° C. Following said reaction, the resultant reaction products are cooled to a temperature of about 82° C. and are treated with 6-15 parts glacial acetic acid dissolved in 18 parts ethanol; maintained at 82° C. for 0.33 hours and further cooled to ambient temperature. Thereafter, the resulting carboxymethylated starch product is separated from the liquid medium by centrifugation and is washed with two 1660 part portions of a solution containing 1360 parts of ethanol and 300 parts of water. Such products are then evaluated for thickening effectiveness at 2, 3 and 4% solids levels in aqueous solutions thereof.

For comparative purposes, the thickening effectiveness is also evaluated for carboxymethylated starch (i.e., "Control") which is prepared by reacting 200 parts of chloroacetic acid with 600 parts dry solids basis starch under the conditions outlined above, except that the reaction temperature is 108° C. and the reaction is carried out for 30 minutes; neutralization is carried out with 18 parts of 60 Be' sulfuric acid (80 wt. & $H_2SO_4$). The resulting carboxymethylated starch is then separated by vacuum filtration and washed once with 2000 parts of a solution containing 150 parts water and 1850 parts of ethyl alcohol.

The degree of carboxymethyl substitution (D.S.) sodium ion content, chloride ion content, sulfate ion content and ash content values for the various carboxymethylated starches are summarized in Table A below along with the thickening effectiveness results at 2, 3 and 4 weight percent solids levels in aqueous solution.

TABLE A

| EXAMPLE NUMBER | D.S. | % ASH | % Na | % Cl$^-$ | % SO$_4$ | RATIO OF TOTAL Cl + SO$_4^=$ CONTENT:D.S. | BROOKFIELD VISCOSITY (cps) | | |
|---|---|---|---|---|---|---|---|---|---|
| | | | | | | | 2% | 3% | 4% |
| 1 | 0.14 | 6.7 | 2.8 | 0.3 | 0.04 | 2.4 | 50 | 1700 | 6,000 |
| 2 | 0.30 | 12.3 | 4.8 | 2.1 | 0.03 | 7.1 | 75 | 950 | 2,100 |
| 3 | 0.30 | 9.7 | 3.9 | 0.45 | 0.04 | 1.6 | 100 | 2100 | 4,800 |
| 4 | 0.37 | 11.0 | 5.1 | 1.0 | 0.07 | 2.9 | 350 | 3500 | 7,100 |
| 5 | 0.37 | 13.0 | 5.3 | 1.7 | 0.03 | 4.7 | 75 | 1350 | 4,725 |
| 6* | 0.41 | 10.2 | 2.9 | 0 | 0 | 0 | 1375 | 5750 | 10,400 |
| 7 | 0.43 | 15.8 | 6.1 | 2.0 | 0.04 | 4.7 | 400 | 2125 | 4,850 |
| 8 | 0.43 | 17.7 | 5.6 | 4.6 | 0.04 | 10.8 | 250 | 1275 | 3,150 |
| Control | 0.36 | 18.6 | 7.7 | 4.7 | 0.78 | 15.2 | 0 | 0 | 1,080 |

*Example 6 is the Example 5 starch derivative following dialysis for salt content reduction purposes.

As can be seen from the results in Table A, the carboxymethyl starch derivatives having a total inorganic anion (i.e., chloride and sulfate) content to D.S. ratio of less than 14 exhibit noticeable viscosifying effectiveness at 2% and 3% solids levels whereas the Control derivative (having an inorganic anion content to D.S. ratio of 15.2) does not. Additionally, at the 4% solids level, the former materials are observed to provide substantially more viscous aqueous solutions than does the latter material.

The indicated starch derivatives, when used to thicken aqueous latex paint compositions, provide superior flow/leveling and spatter resistance characteristics relative to those of comparable paint compositions thickened with hydroxyethyl cellulose.

While the present invention has been described and illustrated by reference to particular embodiments and examples thereof, such is not to be interpreted as in any way limiting the scope of the instantly claimed invention.

What is claimed is:

1. A cold water soluble carboxymethylated granular starch material having an average degree of carboxymethyl substitution in the range of from about 0.15 to about 1.0 of such substituent per anhydroglucose unit in the starch molecule and having a ratio of inorganic anion content, in weight percent on a starch material dry solids weight basis, to carboxymethyl degree of substitution of about 14 or less.

2. The carboxymethylated starch material of claim 1 wherein said material contains an average of from about 0.15 to about 0.6 carboxymethyl substituents per anhydroglucose unit in the starch molecule.

3. The carboxymethlated starch material of claim 1 wherein said material contains less than 0.5 weight percent polyvalent inorganic anions on a starch material dry solids weight basis.

4. The carboxymethylated starch material of claim 3 wherein said material has, on a starch material dry solids weight basis, a monovalent inorganic anion content of less than about 5 weight percent.

5. The carboxymethylated starch material of claim 1 containing less than about 7 weight percent of alkali metal cations on a starch material dry solids weight basis.

6. The starch composition of claim 1 wherein the carboxymethylated starch material has a ratio of total inorganic anion content to carboxymethyl degree of substitution of about 12 or less.

7. The starch composition of claim 1 wherein the carboxymethylated starch material has a ratio of total inorganic anion content to carboxymethyl degree of substitution of about 10 or less.

8. The starch composition of claim 1 wherein the carboxymethylated starch material has a ratio of total inorganic anion content to carboxymethyl degree of substitution of less than about 5.

9. The starch composition of claim 1 wherein the carboxymethylated starch material has a ratio of total inorganic anion content to carboxymethyl degree of substitution of less than about 3.

10. A method for preparing a cold water soluble carboxymethylated granular starch material having an average degree of carboxymethyl substitution in the range of from about 0.15 to about 1.0 of such substituent per anhydroglucose unit in the starch molecule and having a ratio of inorganic anion content, in weight percent on a starch material dry solids weight basis, to carboxymethyl degree of substitution of about 14 or less; said method comprising a. reacting a granular starch starting material with from about 0.15 to 1.2 moles, per equivalent of anhydroglucose unit within said starch starting material, of a carboxymethylating agent in the presence of an alkali metal oxide or hydroxide catalyst and in an aqueous $C_1$-$C_4$ alkanol reaction medium containing from about 1 to about 20 weight percent water on a combined alkanol plus water weight basis;

b. neutralizing residual alkali metal oxide or hydroxide catalyst with an organic carboxylic acid material; and c. washing the resulting carboxymethylated starch product with an aqueous $C_1$-$C_4$ alcohol solution containing from about 5 to about 30 weight percent water on an aqueous alcohol solution weight basis to reduce the inorganic anion content thereof to a level corresponding to an inorganic anion content to carboxymethyl degree of substitution ratio of about 14 or less.

11. A latex paint composition comprising, on a total paint composition weight basis:

a. from about 10 to about 35 weight percent of dispersed colloidal particles of a natural or synthetic polymer material;

b. from about 20 to about 60 weight percent of dispersed pigment particles;

c. from about 35 to about 55 weight percent of water; and d. from about 0.1 to about 1 weight percent of a cold water soluble carboxymethylated granular starch material as a thickener ingredient, said carboxymethylated starch material having an average degree of carboxymethyl substitution in the range of from about 0.15 to about 1.0 of such substituent per anhydroglucose unit in the starch molecule and having a ratio of inorganic anion content, in weight percent on a starch material dry solids weight basis, to carboxymethyl degree of substitution of about 14 or less.

12. The paint composition of claim 11 wherein the colloidal polymer particles comprise an acrylic homopolymer or copolymer material.

13. The paint composition of claim 11 wherein the carboxymethylated starch thickener material contains an average of from about 0.15 to about 0.6 carboxymethyl substituents per anhydroglucose unit in the starch molecule.

* * * * *